(12) United States Patent
Stieber

(10) Patent No.: US 6,398,046 B1
(45) Date of Patent: Jun. 4, 2002

(54) DRUM ROLLER DISPENSER FOR DRY PARTICLES, PARTICULARLY POLYMERIC EROSION CONTROL AGENTS

(75) Inventor: Tim David Stieber, McMinnville, OR (US)

(73) Assignee: Ciba Specialty Chemicals Water Treatments Ltd., Bradford (GB)

(*) Notice: Subject to any disclaimer, the term of this patent is extended or adjusted under 35 U.S.C. 154(b) by 0 days.

(21) Appl. No.: 09/686,547

(22) Filed: Oct. 10, 2000

Related U.S. Application Data

(60) Provisional application No. 60/160,826, filed on Oct. 21, 1999.

(51) Int. Cl.[7] ............................................. G01F 11/28
(52) U.S. Cl. .................. 212/414; 222/410; 222/561; 222/333
(58) Field of Search ................................ 222/414, 561, 222/410, 333

(56) References Cited

U.S. PATENT DOCUMENTS

| | | | | |
|---|---|---|---|---|
| 587,686 A | * | 8/1897 | Frisbee | 222/317 |
| 663,902 A | * | 12/1900 | Hutchison | 222/238 |
| 2,865,536 A | * | 12/1958 | Price | 222/177 |
| 3,190,506 A | * | 6/1965 | Selzler | 222/314 |
| 3,534,787 A | * | 10/1970 | Heck | 141/131 |
| 3,685,468 A | * | 8/1972 | Paige et al. | 111/11 |
| 3,730,397 A | * | 5/1973 | Magnus | 222/254 |
| 3,788,529 A | * | 1/1974 | Christy | 222/314 |
| 3,815,527 A | * | 6/1974 | Dobbins | 111/11 |
| 4,595,128 A | * | 6/1986 | Fielding | 222/252 |
| 4,655,161 A | * | 4/1987 | Thompson | 118/24 |
| 4,927,346 A | * | 5/1990 | Kaiser et al. | 425/81.1 |
| 4,934,917 A | * | 6/1990 | Ashton et al. | 425/101 |
| 5,072,687 A | * | 12/1991 | Mitchell et al. | 118/37 |
| 5,429,788 A | * | 7/1995 | Ribble et al. | 264/510 |
| 5,450,985 A | | 9/1995 | Meuleman | 222/190 |
| 5,857,589 A | * | 1/1999 | Cline et al. | 222/1 |
| 5,878,921 A | * | 3/1999 | Chase et al. | 222/333 |
| 5,911,339 A | * | 6/1999 | Peterson | 222/30 |
| 5,938,076 A | * | 8/1999 | Ganzeboom | 222/23 |
| 6,142,750 A | * | 11/2000 | Benecke | 417/411 |

\* cited by examiner

Primary Examiner—William C. Doerrler
Assistant Examiner—Frederick C Nicolas
(74) Attorney, Agent, or Firm—David R. Crichton

(57) ABSTRACT

The present invention relates to a device for dispensing dry particles into a body of water using a direct current power source delivering about six volts or less. The present invention further relates to an irrigation process using the device for the delivery of an erosion control agent.

18 Claims, 2 Drawing Sheets

DRUM ROLLER DISPENSER FOR DRY PARTICLES, PARTICULARLY POLYMERIC EROSION CONTROL AGENTS

This application claims the benefit of U.S. Provisional Application 60/160,826, filed Oct. 21, 1999.

FIELD OF THE INVENTION

This invention relates to a device for dispensing dry particles, particularly polymeric erosion control agents such as polyacrylamides, in irrigation ditches or furrows for soil stabilization and improved irrigation.

BACKGROUND OF THE INVENTION

In agricultural areas where fields are irrigated by running water into furrows, erosion of the soil is a major problem. While furrow irrigation has significant advantages including water saving and less costly equipment, especially as compared with overhead sprinklers, it also has some disadvantages. In particular, furrow or ditch irrigation causes significant soil erosion as the water running along the furrow washes away soil. In some areas, erosion of topsoil can amount to between 2.8 and 28 tons per acre during a 24 hour watering interval.

In addition, this form of irrigation can remove valuable pesticides and fertilizers that become pollutants in the waterways to which they run, and the soil itself can become less porous, and therefore less able to accept the irrigation water and convey it to plant roots, as fine clay particles settle out of the water and clog soil pores.

It has been found that certain polyacrylamides can alleviate these problems and thereby make furrow irrigation a more useful and less destructive irrigation technique. Polyacrylamides are long-chain polymers that reduce the amount of soil carried by the irrigation water and reduces the negative effect of the erosion on soil porosity.

Polyacrylamides are employed in furrow irrigation by adding selected quantities of the substance in a powder-like form to the irrigation water as the water is dispensed or flows into the field. Dry polyacrylamide particles are highly sensitive to moisture. When the dry polymer is exposed to moisture, the particles tend to become sticky and agglomerate. As the amount of moisture increases, the substance becomes increasingly sticky and no longer flows as a powder.

Polyacrylamide particles are presently dispensed into irrigation ditches or furrows using either belt feeders or auger-type systems. ARK Fisheries, for example, offers a belt feeder that employs an endless belt loop system located within a box container. The polyacrylamide particles are placed on the top of the belt loop. As the belt moves forward, a portion of the polyacrylamide particles fall over the edge and out an opening provided through the bottom of the box. Another company, Andersen R&D, offers a feeding system that uses an auger mechanism to dispense polyacrylamide from the container. The auger mechanism requires a twelve volt battery for operation.

The teachings in U.S. Pat. No. 5,450,985 ("Meuleman") disclose a dispenser system for the application of dry polyacrylamide. The polyacrylamide is dispensed from a container through the action of an impeller provided over the top of an opening in the base of the container. The polyacrylamide falls through the opening into a hose and feed tube to a discharge unit provided over an irrigation furrow. The discharge unit includes a twelve volt fan that draws air into the discharge unit and blows the air past the outlet of the feed tube. Meuleman suggests that the discharge of air past the outlet prevents moisture, particularly in humid environments, from causing the polyacrylamide particles to agglomerate within feed tubes.

SUMMARY OF THE INVENTION

An object of the present invention is to provide an apparatus for dispensing dry erosion control agent into irrigation water.

Yet another object is to provide such a dispensing apparatus which is operable at locations remote from a conventional power source for long intervals of time.

Briefly described, the invention relates, in a first aspect, to a device for dispensing dry particles into a body of water including a material drop tube having an inlet opening and a second opening containing dry particles, a motor attached to said material drop tube, a shaft responsive to said motor, a drum roller having a cylindrical outer surface, wherein the drum roller is positioned horizontally beneath the second opening in said material drop tube and rotates in response to said motor and axle and a direct current power source delivering about six volts or less. Preferably, the direct current power source is a battery delivering about three volts or less. The device may further include a programmable controller connected to said motor adapted to operate said motor at variable speeds for specified periods of time and to thereby dispense particles at variable rates for specified periods of time. The programmable controller can be powered, in whole or in part, by solar cells. The programmable controller and motor can be powered by separate power sources. In a particularly preferred embodiment, the programmable controller and motor are powered by a battery delivering about three volts or less.

The device is particularly suited for the delivery of dry particles that acts as a polymeric erosion control agent in an irrigation ditch or furrow. The dry particles are preferably polyacrylamide particles.

The present invention further relates to an irrigation process including the steps of feeding dry particles into a device substantially as described above, activating the motor of said device to cause rotation of the drum roller and thereby discharging the dry particles from the material drop tube onto the cylindrical outer surface of said drum roller.

DESCRIPTION OF THE PREFERRED EMBODIMENTS

Figure 1:
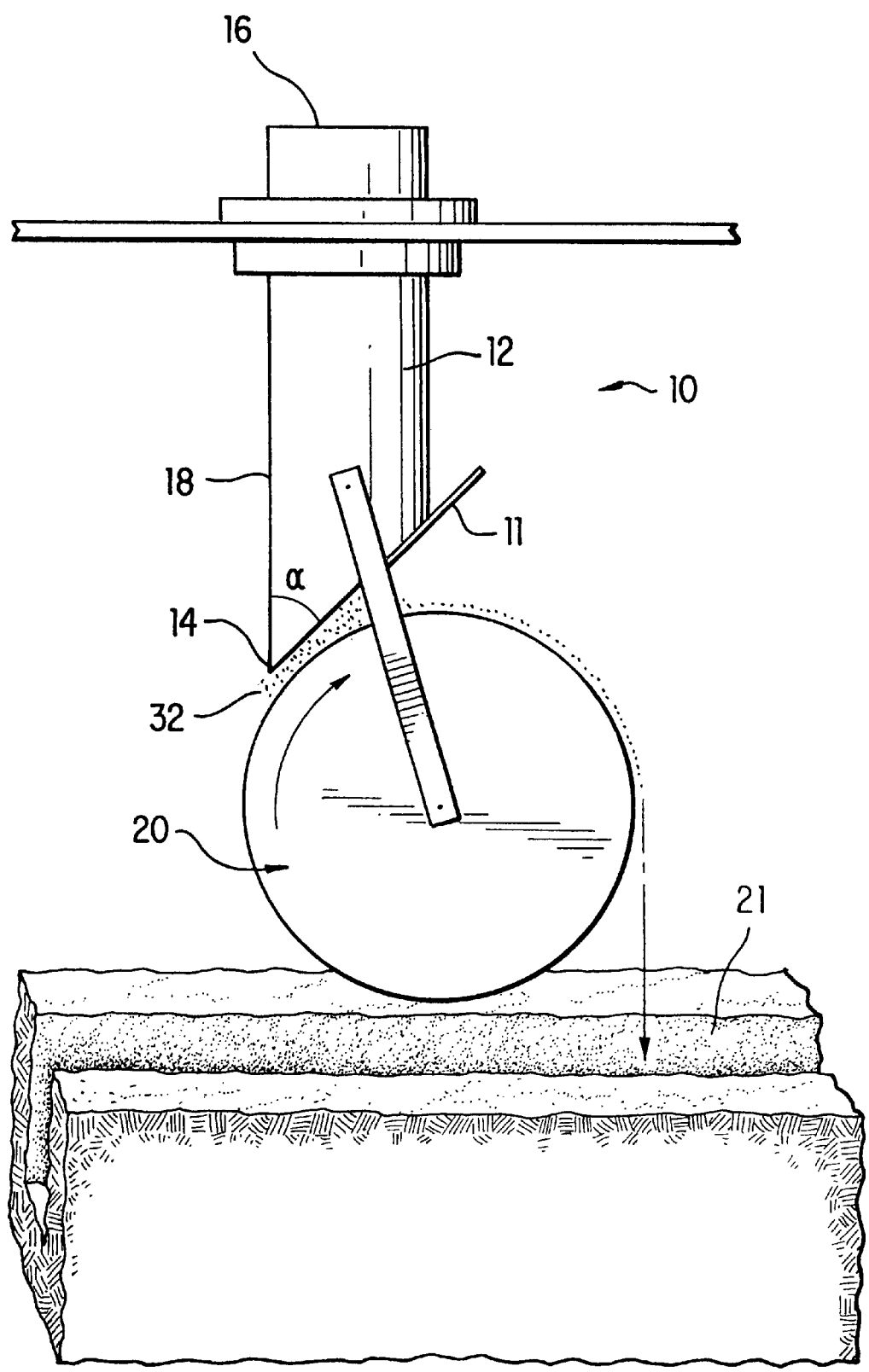
FIG. 1 is a side view of the dispensing system.
Figure 2:
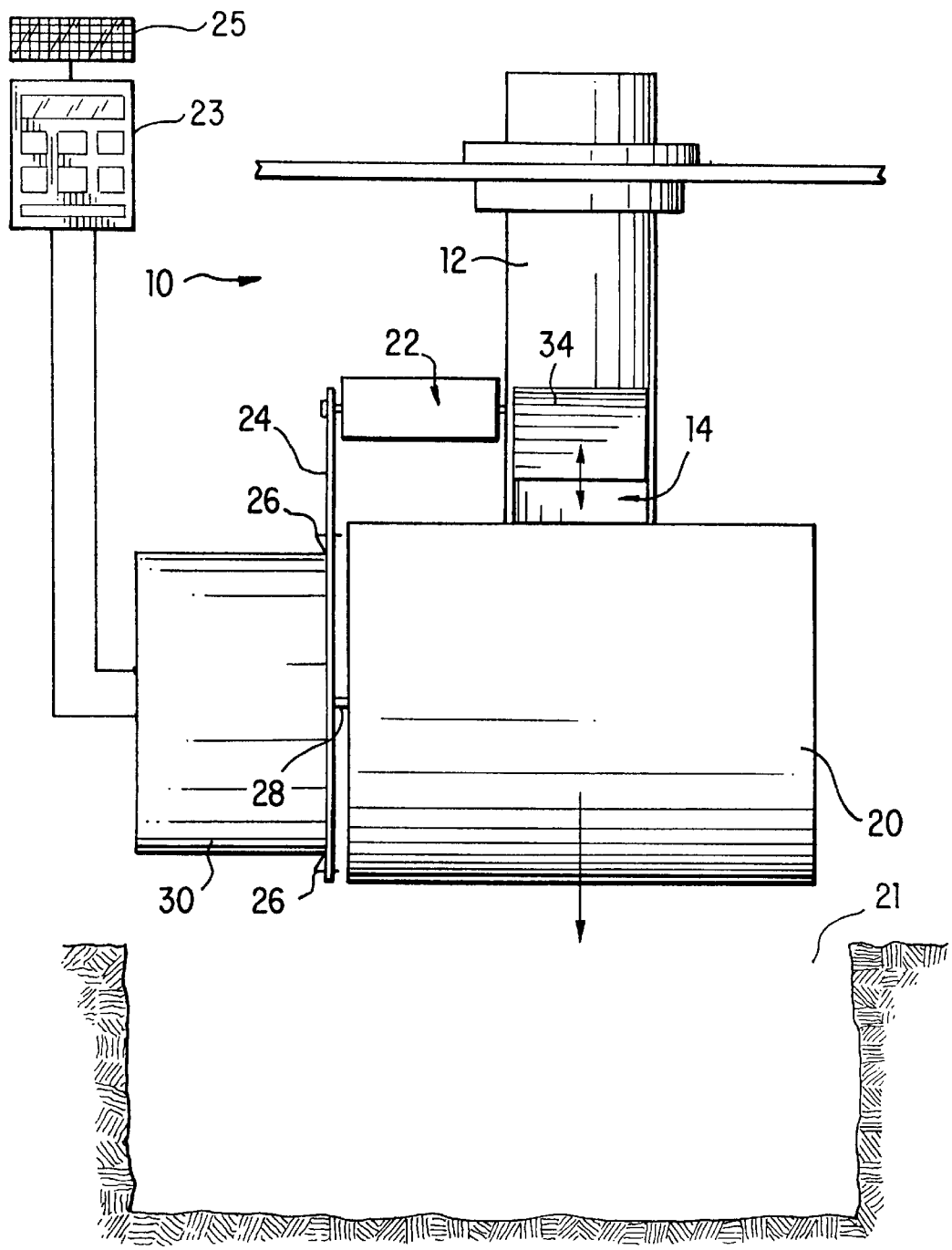
FIG. 2 is a front view of the dispensing system.

The present invention is a dispenser 10 that includes a material drop tube 12 having an inclined base 11 with a variably sized opening 14 at the junction of base 11 and a side wall 18 of material drop tube 10. Material drop tube 10 can be substantially circular or rectangular as long as a straight edge is formed along the width of opening 14. An inlet 16 is provided at the top of material drop tube 10 to introduce a dry particle material 32, such as an erosion control agent, particularly polyacrylamide particles. Inlet 16 preferably has a closure (not shown) to prevent any rain or water spray from entering material drop tube 10. Base 11 is inclined at an angle a of between about 20° and 70° formed between a side wall 18 and base 11. The angle α must be sufficient to allow the particle material 32 to move along base 11 toward opening 14. Preferably the angle of inclination α is from about 30 to 55°, more preferably about 45°.

A drum roller 20 is attached to material drop tube 10 by means of an attachment pack including a gap extender 22 (optional), a bracket 24, clamps 26 and a shaft 28. Drum roller 20 has a cylindrical outer surface and preferably closed sides. Drum roller 20 can be hollow or substantially solid. Drum roller can be constructed from metal or plastic parts. Drum roller is oriented horizontally relative to material drop tube 12 such that discharged particle material 32 falls upon the outer cylindrical surface of said drum roller 20.

Clamps 26 are preferably releasably attached to bracket 24 to allow height adjustments as between drum roller 20 and material drop tube 10. A second attachment pack (not shown) of a gap extender, a bracket, clamps and an axle can optionally be provided on the opposite side of material drop tube for additional support of drum roller 20. Shaft 28 engages a motor 30 capable of rotating drum roller 20 at a rate of about 0.5 to 2 revolutions per minute. Motor 30 is advantageously powered by a direct current power source (not shown) delivering 6 volts or less, more preferably 3 volts or less. Electric motors of this size are commercially available. Motor 30 is also advantageously in communication with a controller (23) that regulates the number of revolutions per minute. The controller can be programmed to vary the number of revolutions over a fixed period of time. Controllers of this nature are well known and commercially available. The controller is preferably powered by a direct current source, such as a battery unit. In an alternative embodiment, the programmable controller is powered, in whole or in part, by solar cell (25). In a still further embodiment, the programmable controller and motor are powered by separate power sources. The total power requirements for the motor and controller (if combined) should be less than the power available from a 6 volt, preferably 3 volt, battery unit.

The dispensing device 10 by means of a support structure is positioned adjacent an irrigation ditch 29. The ditch may be a ditch leading directly to the crops to be irrigated or may be a ditch feeding other irrigation ditches along which crops are planted. The controller is set to commence irrigation at a selected time each day, to reduce the speed of motor 30 at a certain time after starting, and to stop feeding material at a selected time, coordinated with the desired irrigation times. The interval of time before reduction of motor speed may need to be determined experimentally and will depend on the size of the area being irrigated, recognizing that an entire farm of several fields may be treated from one dispenser. At the selected time, water is fed into the irrigation system and the timer turns on, commencing rotation of shaft 28 by motor 30.

The particles 32 provided in material drop tube 10 fall from opening 14 onto the surface of the drum roller 20 which, when rotating, drops particles 32 into the water flowing through the irrigation ditch as it passes under dispensing device 10. A baffle (not shown) is provided at opening 14 that bridges the gap between opening 14 and the surface of drum roller 20 to prevent gravity flow of particles 32. Drum roller preferably rotates in a clockwise direction (as shown in FIG. 1) such that the particles 32 are discharged on the downward side of the drum roller 20, are carried up underneath base 11 and are ultimately discharged on the opposite side of drum roller 20. The size of opening 14 can be varied by moving sliding plate 34 up or down along guide channels (not shown). Sliding plate 34 can be fixed in position simply by friction along the guide channels or, alternatively, latching or locking mechanisms can be provided on drop tube 12. Either alternative is well within the skill of those working in the field. Varying the height of opening 14 provides the ability to control the discharge rate of particles 32 from material drop tube 12. Operator experimentation will produce the desired size of opening 14 and drum roller 20 rate of revolutions.

While certain advantageous embodiments of the invention have been described in detail, it will be apparent to those skilled in the art that various changes and modifications can be made therein without departing from the scope of the invention as defined by the appended claims.

I claim:

1. An irrigation assembly comprising an irrigation ditch, a device positioned adjacent said irrigation ditch for dispensing dry particles said device comprising:
    a) a material drop tube having an inlet opening and a second opening containing dry particles;
    b) a motor attached to said material drop tube;
    c) a shaft responsive to said motor;
    d) a drum roller having a cylindrical outer surface, wherein the drum roller is positioned horizontally beneath the second opening in said material drop tube and rotates in response to said motor and said shaft; and
    e) a direct current power source delivering about six volts or less.

2. The device according to claim 1 wherein the direct current power source is a battery delivering about three volts or less.

3. The device according to claim 1 wherein the motor is releasably attached to said material drop tube.

4. The device according to claim 1 wherein the dry particles are polyacrylamide particles.

5. The device according to claim 2 further comprising a programmable controller connected to said motor adapted to operate said motor at variable speeds for specified periods of time and to thereby dispense particles at variable rates for specified periods of time.

6. The device according to claim 2 wherein the dry particles are a polymeric erosion control agent.

7. The device according to claim 2 wherein the dry particles are a polyacrylamide-based erosion control agent.

8. The device according to claim 5 wherein the programmable controller and motor are powered by separate power sources.

9. The device according to claim 5 wherein the programmable controller and motor are powered by a battery delivering about three volts or less.

10. The device according to claim 5 wherein the programmable controller is solely or partially powered by solar cells.

11. An irrigation process comprising:
    a) feeding dry particles into a device comprising
        1) a material drop tube having an inlet opening and a second opening,
        2) a motor attached to said material drop tube,
        3) a shaft responsive to said motor,
        4) a drum roller having a cylindrical outer surface, wherein the drum roller is positioned horizontally beneath the second opening in said material drop tube and rotates in response to said motor and said shaft, and
        5) a direct current power source delivering about six volts or less;
    b) activating said motor to cause rotation of the drum roller;
    c) discharging the dry particles from the material drop tube onto the cylindrical outer surface of said drum roller and from the roller into an irrigation ditch adjacent to which the device is positioned.

12. The process according to claim 11 wherein the direct current power source is a battery delivering about three volts or less.

13. The process according to claim 11 wherein the dry particles are an erosion control agent.

14. The process according to claim 11 wherein the motor is releasably attached to said material drop tube.

15. The process according to claim 12 wherein the device further comprises a programmable controller connected to said motor adapted to operate said motor at variable speeds for specified periods of time and to thereby dispense polyacrylamide at variable rates for specified periods of time.

16. The process according to claim 15 wherein the programmable controller is solely or partially powered by solar cells.

17. The process according to claim 15 wherein the programmable controller and motor are powered by a battery delivering about three volts or less.

18. The process according to claim 13 wherein the dry particles are an polyacrylamide-based erosion control agent.

* * * * *